United States Patent [19]

West

[11] 4,333,707
[45] Jun. 8, 1982

[54] METHOD OF IMAGE ENHANCEMENT

[76] Inventor: Laurice J. West, 24 Morningside Dr., Yardley, Pa. 19067

[21] Appl. No.: 188,340

[22] Filed: Sep. 18, 1980

Related U.S. Application Data

[63] Continuation-in-part of Ser. No. 32,729, Apr. 23, 1979, abandoned.

[51] Int. Cl.³ ............... G02B 27/22; H04N 9/54; H04N 5/72
[52] U.S. Cl. ................... 350/144; 350/320; 358/89; 358/250
[58] Field of Search ............ 350/144, 167, 131, 128, 350/129, 320; 358/89, 250

[56] References Cited

U.S. PATENT DOCUMENTS

| | | | |
|---|---|---|---|
| 1,351,491 | 8/1920 | Schwabacher | 351/45 |
| 1,636,450 | 7/1927 | Ames | 350/144 |
| 2,374,566 | 4/1945 | Tanaka | 350/144 |
| 2,401,271 | 5/1946 | Suner | 352/43 |
| 2,728,013 | 12/1955 | Tourshou et al. | 313/479 |
| 2,740,954 | 4/1956 | Kleefeld | 358/251 |
| 2,746,030 | 5/1956 | Schrecongost | 358/251 |
| 2,884,833 | 5/1959 | Pohl | 358/89 |
| 2,888,855 | 6/1959 | Tanaka | 350/144 |
| 2,897,488 | 7/1959 | Rigney et al. | 358/251 |
| 2,922,998 | 1/1960 | Stephenson | 358/252 |
| 2,986,969 | 6/1961 | Muncheryan | 350/144 |
| 3,053,135 | 9/1962 | Tanaka | 350/144 |
| 3,145,264 | 8/1964 | Schulz | 358/251 |
| 3,498,293 | 3/1970 | Oppenheimer | 350/144 |
| 3,582,961 | 6/1971 | Shindo | 358/89 |
| 3,597,042 | 8/1971 | Favre | 350/144 |
| 4,049,339 | 9/1977 | Ledan | 350/144 |

FOREIGN PATENT DOCUMENTS 1101550 10/1955 France ............... 350/144

Primary Examiner—Jon W. Henry
Attorney, Agent, or Firm—Howson and Howson

[57] ABSTRACT

The appearance of depth in a two-dimensional image on a television screen or the like is achieved by optical bending means positioned between the image plane and the observer. The optical bending means produces a horizontal shift of points in the image such that the left and right eyes of the observer see a different spacing between pairs of points. The optical bending means can be in the form of a transparent undulating sheet, or can be in the form of undulations incorporated in the envelope of a television tube. It is positioned sufficiently close to the image plane that any pair of rays diverging from any point and striking the bending means continue to diverge.

2 Claims, 4 Drawing Figures

METHOD OF IMAGE ENHANCEMENT

CROSS REFERENCE TO RELATED APPLICATION

This is a continuation-in-part of my copending application Ser. No. 32,729, filed Apr. 23, 1979, now abandoned.

BACKGROUND OF THE INVENTION

This invention relates to viewing systems, and in particular to an improved viewing system for producing a simulation of depth in substantially two-dimensional visual images such as television images. The invention also relates to improvements in viewing systems for improving clarity and color rendition in such two-dimensional images.

Conventional systems for producing the appearance of depth in two-dimensional images incorporate depth information in the image itself, and provide special viewing means for utilizing the depth information. For example, in the now obsolete "3-D" motion pictures, the image displayed on the motion picture screen was actually two superimposed images which were separated by means of polarizers or colored filters. The polarizers or colored filters were incorporated in special glasses or viewers provided to the theater patron so that one eye of the patron would perceive one of the two images, and the other eye would perceive the other of the two images.

Various unconventional attempts have been made in the past to produce the simulation of depth in the viewing of two-dimensional images containing no special depth information. For example, the image on a television screen, or the image of a conventional motion picture on a motion picture screen, contains no special depth information, and can be viewed in the conventional manner without giving the impression of depth.

One such attempt at depth simulation was described in U.S. Pat. No. 4,049,339, issued Sept. 20, 1977 to Antoine Ledan. Ledan described a pair of eyeglasses for movie viewing which are designed to produce a simulated three-dimensional effect. The eyeglasses have flat, triangular-shaped lenses in an opaque frame. These lenses are arranged so that the left edge of the image on the movie screen is obscured from view through the left eye, and so that the right edge of the image is obscured from view through the right eye. The eyeglasses described by Ledan produce the sensation of depth by the so-called "window effect", i.e. by preventing the observer from determining the distance between himself and the movie screen. The effect described in the Ledan patent is somewhat similar to the effect utilized to simulate depth in wide-screen and curved-screen movie systems. The purpose of the wide screen or the curved screen is to fill the observer's field of view, preventing him from seeing the edges of the screen and thereby determining the distance between his eyes and the screen.

Another approach to producing illusions of depth is described by Hugh M. Stevenson in his U.S. Pat. No. 2,922,998, dated Jan. 26, 1960. Stevenson describes a television having, in front of the picture area, a sheet of transparent material with opaque or translucent vertical lines. According to Stevenson, the illusion of depth is due to the slightly different picture presentation for each eye combined with the placement of the substantially vertical parallel lines in front of and spaced apart from the plane of the picture presentation.

Another system for depth simulation was described by H. M. Muncheryan in his U.S. Pat. No. 2,986,969, dated June 6, 1961. Muncheryan described a binocular device having a pair of relatively rotatable polarizers in each eyepiece. Depth simulation was achieved by rotating the plane of polarization of one polarizing lens with respect to the other in one eyepiece until objects viewed have obtained apparent curvatures and depths. This effect is said to be more prominent in the angular range of 30 to 50 degrees between the polarization axes of the two polarizing elements. After the polarizers in one eyepiece are adjusted, the polarizing lens of the other eyepiece is rotated until the transmitted light intensity through that eyepiece is comfortable to the eye.

Another optical aid for simulating depth in two-dimensional images such as screen projections, drawings and photographs, was described by A. Ames, Jr. in U.S. Pat. No. 1,636,450, dated July 19, 1927. Ames used a pair of eyeglasses having a system of prisms and lenses which eliminated actual perceptive sensations. The system blurred the image seen by one eye, preferably by means of a cylindrical lens which blurs only vertical lines, leaving horizontal lines sharp. The theory of operation, as explained by Ames, is that the system of prisms and lenses causes the position of the picture in space to be indeterminate. The system of prisms and lenses causes both eyes to be relaxed in convergence and in their accommodations. The eyes are caused to have differently relaxed accommodations, which prevent any sensory ascertainment of distances by accommodative stress. The result is to free the observer from any compulsory suggestion arising from actual perceptive sensations, and from any compelling belief that the arrangement of line and light and shade before the viewer lie in any one plane. The reaction in the observer is that the picture objects appear in near and far relation suggested by their sizes, shadows and perspective.

F. Pole, in U.S. Pat. No. 2,884,833, dated May 5, 1959, describes a three-dimensional effect produced by means of a transparent, curved lenticular screen, having an array of individual lenses, which are preferably so small that they cannot be discerned by the normal eye when viewed from the normal viewing distance.

Nawokich Tanaka in U.S. Pat. Nos. 2,374,566, dated Apr. 24, 1945, 2,888,855, dated June 2, 1959 and 3,053,135, dated Sept. 11, 1962, describes several versions of a system for simulating three-dimensional viewing in which, by means of a special reflector or lens system, secondary images are produced which are said to give rise to a three-dimensional effect.

In French Pat. No. 1,101,550, granted Apr. 20, 1955, Gilbert-Jacques Robin describes the creation of stereoscopic effects by using a transparent plate having alternately interpositioned convergent and divergent cylindrical lenses. The plate has a large number of lenses, typically one lens for each millimeter of plate width. The number of lenses is related to the locations of the image plane, the plate and the observer so that, for any given very small area on the image plane, one eye will see it reduced, and the other eye will see it enlarged.

In all of the foregoing viewing systems of the prior art, a simulated three-dimensional effect is achieved at the expense of image quality. That is, each system of the prior art either partially obscures the image or produces a blurring of visual information. In the former case there is at least a loss of light from the picture, and the loss of light may be accompanied by a loss of picture information. In the latter case, blurring of visual information has a tendency to cause eyestrain, and to make viewing for extended periods of time somewhat unpleasant. Nevertheless, apparently obscuration and/or blurring have been considered essential heretofore in the production of three-dimensional effects from conventional two-dimensional images.

SUMMARY OF THE INVENTION

The principal object of this invention is to provide a simple viewing system for depth simulation in which obscuration of picture information is avoided, and in which there is no blurring of visual information. It is also an object of the invention to produce depth simulation in the viewing of two-dimensional images without the need for special eyeglasses or binoculars. Still another object of the invention is to provide a viewing system for improving image clarity and color rendition in addition to providing depth simulation.

In accordance with the invention, the foregoing objects are achieved by the use of optical bending means, located in a path through which the two-dimensional image is viewed by an observer, for selectively bending light rays extending from the image plane to the eyes of the observer so that, for substantially any two horizontally spaced points in the image plane, the left and right eyes of the observer perceive a different horizontal spacing between said points. The optical bending means maintains substantially the same perceived overall image size for both eyes of the observer, and is located sufficiently close to the image plane that any two rays emanating from a point on the image plane and passing through the optical bending means are diverging.

The optical shift is carried out by means of a transparent sheet having an index of refraction higher than that of air and having undulating horizontal cross-sections. The undulations may be formed on either or both surfaces of the sheet. The distance h between the adjacent peaks and valleys of the undulations is at least approximately ten times greater than $sd_1/d_2$, where s is the interocular spacing of the observer, $d_1$ is the closest distance between the image plane and the surface of the optical bending means nearest the image plane, and $d_2$ is the distance between the image plane and the observer. The distance h is therefore sufficiently large that, when the observer is located at a normal viewing distance from the image plane, any two rays extending from a single point on the image plane respectively to the eyes of the observer intersect the surface nearest the image plane at a spacing of less than about 0.1h, measured in a direction parallel to the image plane.

The transparent sheet is formed in such a way that distortion of the image by the undulations is not readily perceived by the average observer. To this end the undulations are formed so that, to the extent they serve as lenses, their effective focal lengths are greater than approximately 400 mm. That is, any two rays which approach the sheet in parallel directions are refracted by the sheet into paths which converge at a distance of at least approximately 400 mm. from the sheet. The magnification (or reduction) of any area in the image plane is only about 5% or less; hence little if any distortion is evident to the average observer.

The operation of the viewing system in accordance with the invention involves the optical shifting of the horizontal placement of points in the two-dimensional image so that the eyes of the observer perceive different spacings between pairs of points. The horizontal shift of the placement of points in the two-dimensional image produces a slight but unobjectionable distortion characterized by a difference in the spacing between points as observed through the right and left eyes of the observer. These differences in spacing produce the sensation of depth, and the perceived depths of the various objects in the two-dimensional image arise from visual clues such as the relative sizes of objects, shadows and the obscuration of farther objects by nearer objects.

The optical bending means neither masks the picture nor diminishes the transmission of light from the picture to the observer. Thus, there is no obscuration of picture information. The optical bending means is designed to allow both eyes to perceive the same overall image size. Consequently there is no blurring of picture information in either eye by reason of differential magnification. Blurring by reason of secondary or "ghost" images is avoided by positioning the optical bending means in relation to the positions of the image plane and the observer so that rays from any point on the image plane diverge in the space between the optical bending means and the observer. Since the observer views any given small area through less than about 10% of the peak-to-valley distance of the undulating sheet, the invention avoids blurring caused by magnification of small areas for one eye and reduction of the same small areas for the other eye.

While masking or blurring were apparently previously thought to be essential in the production of a simulated three-dimensional effect, I have discovered that, with the use of appropriate optical bending means as hereinafter described in detail, masking and blurring can be substantially eliminated, and that sharply defined images having a remarkable appearance of depth can be produced.

The foregoing objects, as well as various other objects of the invention will be more apparent from the following detailed description, when read in conjunction with the drawings.

DETAILED DESCRIPTION

Figure 1:
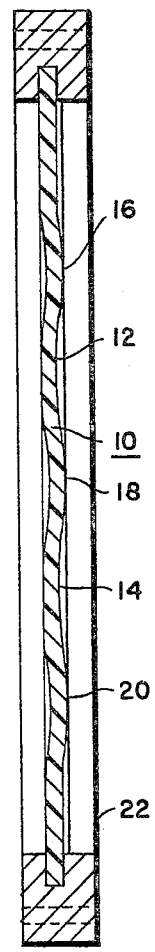
FIG. 1 is a horizontal section of an undulating transparent sheet in accordance with the invention.

In one embodiment of the invention, a transparent sheet having substantially uniform undulating horizontal cross-sections is positioned in the path through which the two-dimensional image is viewed by the observer. FIG. 1 shows a suitable transparent undulating sheet 10, preferably made from an acrylic polymer such as poly(methyl methacrylate), or a similar transparent material having a refractive index substantially higher than that of air. A series of undulations is formed in sheet 10 comprising alternating ridges and valleys which extend in the vertical direction. The valleys are indicated at 12 and 14, and the ridges are indicated at 16, 18, and 20. In the case of polycarbonates, poly(methyl methacrylate), and other thermoplastic material, the undulations can be readily formed by the application of heat using electrically heated strips. A typical undulating sheet of the type shown in FIG. 1 is 13 mm. in thickness. The depth of the valleys, measured from the peaks in the direction perpendicular to the sheet is typically 0.8 mm., and the distance between the tops of the peaks and the bottoms of the adjacent valleys, measured in the direction parallel to the sheet, is approximately 30 mm.

Preferably, the undulations are approximately sinusoidal. However, they may vary from an exact sinusoidal configuration. For example, they may be in the form of circular arcs. The undulations should be smooth so that the surfaces of the sheet do not at any point exceed the critical angle with respect to the paths of light rays passing through the sheet, thereby causing reflections. The smoothness of the undulations is also important to the avoidance of secondary images.

The faces of the sheet are substantially straight in the vertical direction. Hence, the horizontal cross-sections of the sheet are substantially uniform. While uniformity of the horizontal cross-sections is desirable from the standpoint of ease of manufacture, a minor curvature in the vertical direction can be tolerated, and may even be desirable in order to avoid the appearance of vertical bands of light reflected by the sheet from lamps, windows, and the like. It is likewise unnecessary for the undulations to be strictly vertical, and in fact some deviation from a strictly vertical configuration may be desirable to avoid an artificial appearance in the image.

Figure 2:
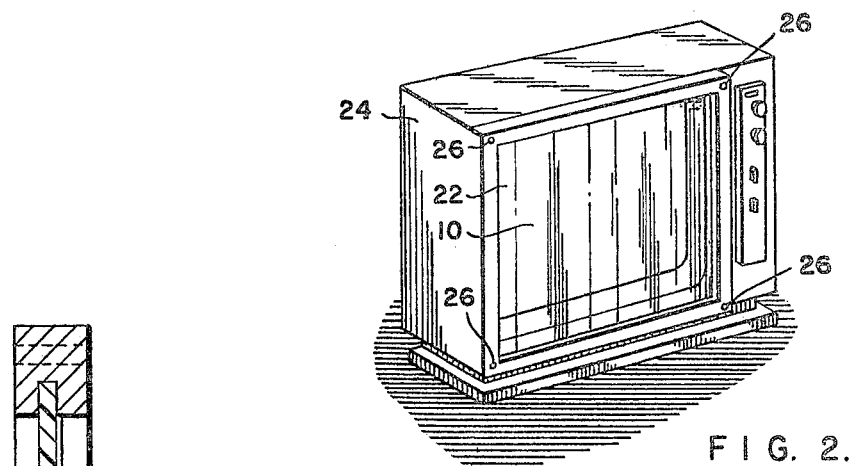
FIG. 2 is a perspective view showing the undulating transparent sheet of FIG. 1 used in conjunction with a television set.

Preferably, for convenient attachment to a television set, the undulating sheet is mounted in a four-sided frame 22, the sides of the frame being provided with slots receiving the edges of the sheet. The frame is secured to the television set housing 24 (as seen in FIG. 2) by means of screws 26 so that the sheet is positioned directly in front of the television screen with its undulations extending in the vertical direction.

For convenience, the sheet may be placed in close proximity to the screen, i.e., either touching the screen or within a distance of about two centimeters from the screen. If a sheet made for use in close proximity to the screen is used at a greater distance that intended, the viewing angle will be reduced because gaps will appear in the image when it is viewed obliquely.

Figure 3:
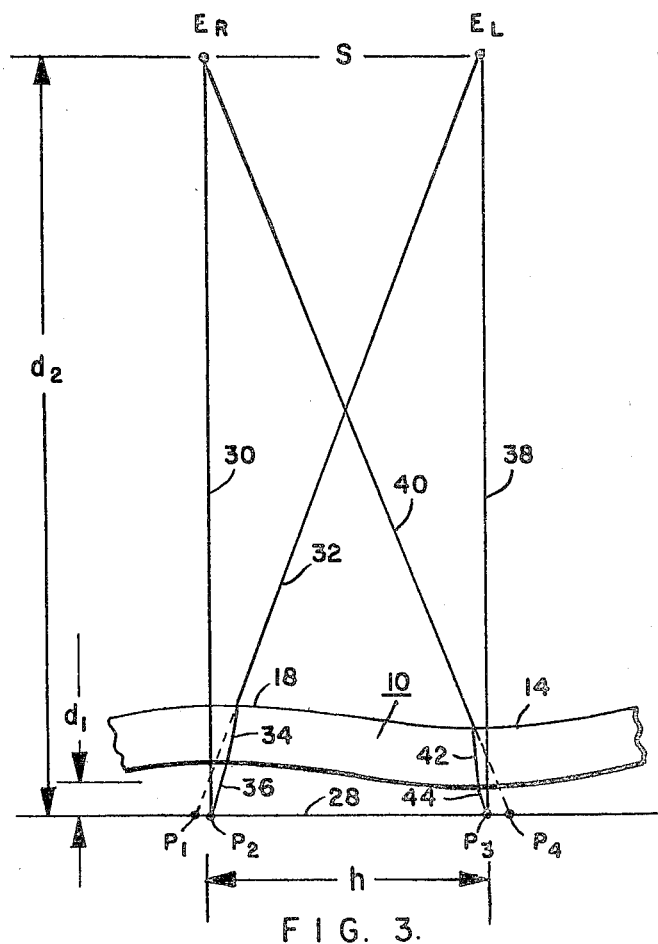
FIG. 3 is a schematic diagram illustrating the operation of the transparent undulating sheet.

The operation of the sheet 10 is illustrated in FIG. 3, in which a portion of the sheet, comprising peak 18 and valley 14 is shown in close proximity to image plane 28 of the television set. Points $P_2$ and $P_3$ represent two laterally spaced points in the image appearing on the television screen. $E_R$ is the right eye of the observer, and $E_L$ is the left eye.

Since $E_R$ and $P_2$ are directly in line with the center of peak 18, light path 30, between $P_2$ and $E_R$ passes directly through the sheet without any transverse displacement. The right eye, therefore, sees point $P_2$ in its correct position. The left eye $E_L$, however, views point $P_2$ through light paths 32, 34, and 36 as as result of refraction in the transparent sheet. Consequently, point $P_2$ is seen by the left eye $E_L$ at the position of point $P_1$, which (from the observer's standpoint) is located to the right of point $P_2$.

The left eye $E_L$ views point $P_3$ directly and without refraction through light path 38. The right eye $E_R$, however, views point $P_3$ through light paths 40, 42, and 44 as a result of refraction. Consequently, the right eye $E_R$ views point $P_3$ at the point of $P_4$, which is displaced to the left of position $P_3$.

The distance between $P_1$ and $P_3$ is slightly less than the distance from $P_2$ to $P_4$. Therefore, the right eye perceives a greater distance between the two points than does the left eye.

The undulations in sheet 10 cause the eyes of the observer to observe different distances between laterally spaced points except in the relatively few instances where symmetry causes pairs of points to be perceived at the same lateral spacing by both eyes. Consequently, for substantially any two horizontally spaced points in the image on television screen 28, the left and right eyes of the observer perceive a different horizontal spacing between the points. The resultant slight distortion caused by the interposition of undulating sheet 10 between the image and the observer is unobjectionable, and is apparently compensated for in the brain of the observer with the result that the observer receives the impression of depth in the image. The relative depths of the various components of the image are apparently determined by the observer automatically by taking into account his experiences in the real three-dimensional world. The observer automatically takes into account visual clues such as, for example, the fact that two objects, known to be the same size in actuality, are seen to be of different sizes. The differences in sizes is interpreted in such a way that the smaller-appearing object appears to be farther away than the larger-appearing object. The observer also apparently takes into account other clues such as shadows, and relative velocities in the case of a moving image.

The undulating sheet, while causing minor distortions in the horizontal distances between points as observed through the sheet, does not materially change the overall image size. Consequently, each eye of the observer perceives substantially the same overall image size.

The sheet can, of course, be modified so that it produces an overall magnification or reduction. This can be accomplished, for example, by adding a large magnifying lens, or by making the front face entirely convex, and forming undulations only on the back face. Various other means for overall magnification or reduction, of course, can be used.

The various parameters of the viewing system such as the depth of the undulations, the index of refraction of the transparent sheet, the thickness of the sheet, and the distance between the sheet and the image on the television screen are interdependent in certain respects. For example, a given differential displacement (the distance $P_2$, $P_4 - P_3$, $P_1$) can be achieved by reducing the depth of the undulations of the transparent sheet, and at the same time increasing the thickness of the sheet, the index of refraction, or the distance between the sheet and the screen. Combinations of the parameters may also be taken into account so that, for example, the depth of the undulations can be decreased, and the thickness and distance from the screen can both be altered to produce the same results.

The depth of the undulations, the index of refraction, and the distance between the undulating sheet and the television screen also determine the maximum viewing angle. The maximum viewing angle is the horizontal angle through which the image may be viewed without the appearance of gaps resulting from interior reflections of light in the undulating sheet. These gaps would appear where the observer attempts to view a point on the image through a path such that the light ray from the point strikes the front surface of the undulating sheet at an angle of incidence exceeding the critical angle, i.e. that angle at which total reflection occurs. For a given sheet the viewing angle decreases as the depth of the undulations increases; it decreases with distance between the undulating sheet and the television screen; and it decreases with increases in the index of refraction of the undulating sheet material. Preferably, the viewing angle is at least 120°, measured from one extreme position of the viewer to the other extreme position. For a given undulating sheet, the range of the viewing angle can be readily adjusted by adjusting the distance between the sheet and the television screen.

The dimensions of sheet 10 and its proximity to the image plane at screen 28 are also important from the standpoint of eliminating secondary or ghost images. While the sheet has a uniform thickness, portions of the sheet act as lenses, causing magnification or reduction depending upon the curvature. In the overall image, magnification and reduction caused by the peaks and valleys cancel each other out so that the apparent image size is not materially affected. However, depending on the curvature of the undulations, the peaks of the undulations can act as magnifying lenses.

As is well known, a pair of rays diverging from a point and passing through a conventional magnifying lens may become parallel, or they may diverge or converge depending upon the distance between the lens and the point. In the event that the rays tend to converge, the point of convergence is affected by the distance between the lens and the point in the image. In the case of a powerful magnifying lens, convergence of the rays may occur at a location quite near the lens. If the observer is positioned at a point behind the point of convergence he will see an inverted image. If the observer is positioned between the lens and the point of convergence, he will see a blurred image (i.e. ghost images). In the case of an object at the focal point of a spherical lens, the observer will not see any image at all. In the case of an object at the focal point of a cylindrical lens, the image will be severely blurred.

The peaks in an undulating sheet act as relatively weak lenses and are generally subject to the same effect unless the undulating sheet is of uniform thickness. Thus, if an undulating transparent sheet of non-uniform thickness, and having a given set of parameters, is positioned too far from the image plane, at least some rays emanating from a point on the image plane will tend to reconverge on the opposite side of the undulating sheet. If the observer is located behind the point of reconvergence, he will see a series of alternating erect and inverted images. If the observer is located in front of the point of reconvergence, or if the object is at the focal point, the image will be partially blurred.

With the viewing system in accordance with the invention, a three-dimensional effect can be produced, while retaining a sharp picture image by positioning the undulating sheet sufficiently close to the image plane that substantially any two rays emanating from any point on the image plane and passing through the undulating sheet are diverging. In this way, the image can be seen clearly without the need for the observer to wear special corrective glasses.

Preferably, the undulating sheet is smooth (i.e. free of sharp bends) in which event it can be spaced some distance away from the image plane without causing blurring. If sharper bends are present in the sheet, it is necessary to position the sheet very close to the image plane. In the case of an undulating sheet having extremely sharp bends, it may be impossible in practice to bring it sufficiently close to the image plane to achieve divergence of substantially all points in the image plane.

Another important parameter of the undulating sheets is the horizontal distance between the high points of the peaks and the low points of the adjacent valleys. For the maximum differential displacement of horizontally spaced points in the image plane, the undulating sheet would be placed a considerable distance from the image plane and the horizontal distance h between adjacent peaks and valleys of the undulations would be related to the interocular spacing s of the observer in accordance with the following proportionality: $h/s = d_1/d_2$ where: $d_1$ is the distance between the image plane and the side of the undulating sheet nearest the image plane; and $d_2$ is the distance between the image plane and the observer. Where this relationship exists or is approximated, a point in the image plane is displaced in opposite directions for the two eyes of the observer. The above relationship gives rise to various practical problems. If the peaks and valleys are wide, the relationship $h/s = d_1/d_2$ requires the sheet to be spaced a considerable distance from the image plane, in which case, it severely limits the viewing angle. On the other hand, if the undulating sheet is placed very close to the image plane, the above proportionality could only be achieved by placing the peaks and valleys very close together, in which case, the effect would not approximate what occurs in a natural three-dimensional scene. In either case, the sheet would magnify small areas for one eye and reduce the same small areas for the other eye. This would interfere with image quality, and the interference would be more severe with greater degrees of magnification and reduction. The system in accordance with the invention uses a relatively wide spacing between the high points of peaks and the low points of adjacent valleys such that h is at least approximately ten times $sd_1/d_2$. The invention relies upon the fact that, even though most points are shifted in the same direction, they are shifted by different amounts for the two eyes of the observer.

In a typical system using a small screen television $d_1$ is 13 mm., $d_2$ is 750 mm., and h is 30 mm. S is assumed to be 65 mm. Thus h is approximately twenty six times s $d_1/d_2$.

For a large screen television, $d_1$ might be 63 mm and $d_2$ might be 1500 mm. A typical value for h would be 63 mm. Here h would be approximately twenty three times s $d_1/d_2$.

Finally, focal length is an important parameter, since it is necessary to avoid localized distortion of small areas due to excessive magnification or reduction by lens effect of the undulations. In accordance with the invention the minimum focal length for the undulating screen is preferably at least approximately 400 mm., as shorter focal lengths would tend to produce readily perceptible distortion of the image.

Figure 4:
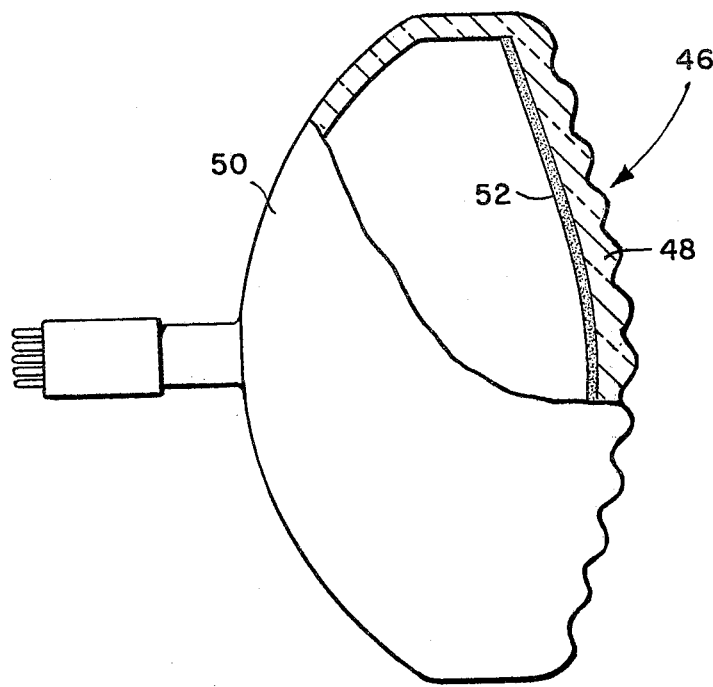
FIG. 4 is a top plan view, partly in section of a television tube incorporating an undulating transparent sheet as part of its envelope.

The optical bending means can be built into a television tube, as illustrated in FIG. 4, in which a series of vertically extending undulations 46 is formed in screen 48, which is part of the envelope of television tube 50. The interior side of screen 48 is provided with a phosphor coating 52, and is curved in the conventional manner so that it forms what is essentially an image "plane". The glass of screen 48 varies in thickness by reason of the undulations 46 on its outer surface. Here again, the undulations are smooth, and free of sharp bends, and screen 48 is sufficiently close to the image plane at phosphor coating 52 that rays diverging from any point in the image plane continue to diverge in the space between screen 48 and the observer. Since the undulations 46 are very close to the image plane, the high points of the peaks can be fairly close to the low points of the valleys while still satisfying the requirements that h be at least about ten times s $d_1/d_2$ at a normal viewing distance. For example, if $d_1$ is 10 mm. and h is 26 mm., the observer will satisfy the relationship $h \geq 10sd_1/d_2$ at any viewing distance up to as close as 25 cm., which is as close as most observers can get while still focusing their eyes on the image.

In the case of an undulating television tube envelope, the depths of the undulations will normally be relatively shallow compared to those of the undulating sheet of FIG. 1 in order to satisfy the requirement that the minimum focal length be at least approximately 400 mm.

I claim:

1. A method of viewing a substantially two-dimensional visual image in an image plane comprising the steps of: locating optical bending means in a path through which said image is viewed by an observer at a position between said image plane and said observer such that any two rays emanating from substantially any point on said image plane pass through said optical bending means and diverge in the place between said observer and said bending means; maintaining substantially the same perceived overall image size for both the eyes of the observer with said optical bending means; and selectively bending light rays extending from said image plane to the eyes of the observer, using said optical bending means, so that, for substantially any two horizontally spaced points in the image plane, the left and right eyes of the observer perceive a different horizontal spacing between said points; in which said selective bending step is carried out by optical bending means in the form of a transparent sheet having a refractive index higher than that of air and having undulating horizontal cross-sections, and in which the distance h between the high points of the peaks and the low points of the adjacent valleys of the undulations is at least approximately ten times greater than $sd_1/d_2$ where s is the interocular spacing of the observer, $d_1$ is the closest distance between the image plane and the surface of the optical bending means nearest the image plane, and $d_2$ is the distance between the image plane and the observer, and in which the undulations are formed so that the effective focal length at substantially any location on the surface of the optical bending means is at least approximately 400 mm.

2. A method according to claim 1 in which said transparent sheet is an integral part of the envelope of a television tube.

* * * * *